Figure 1:
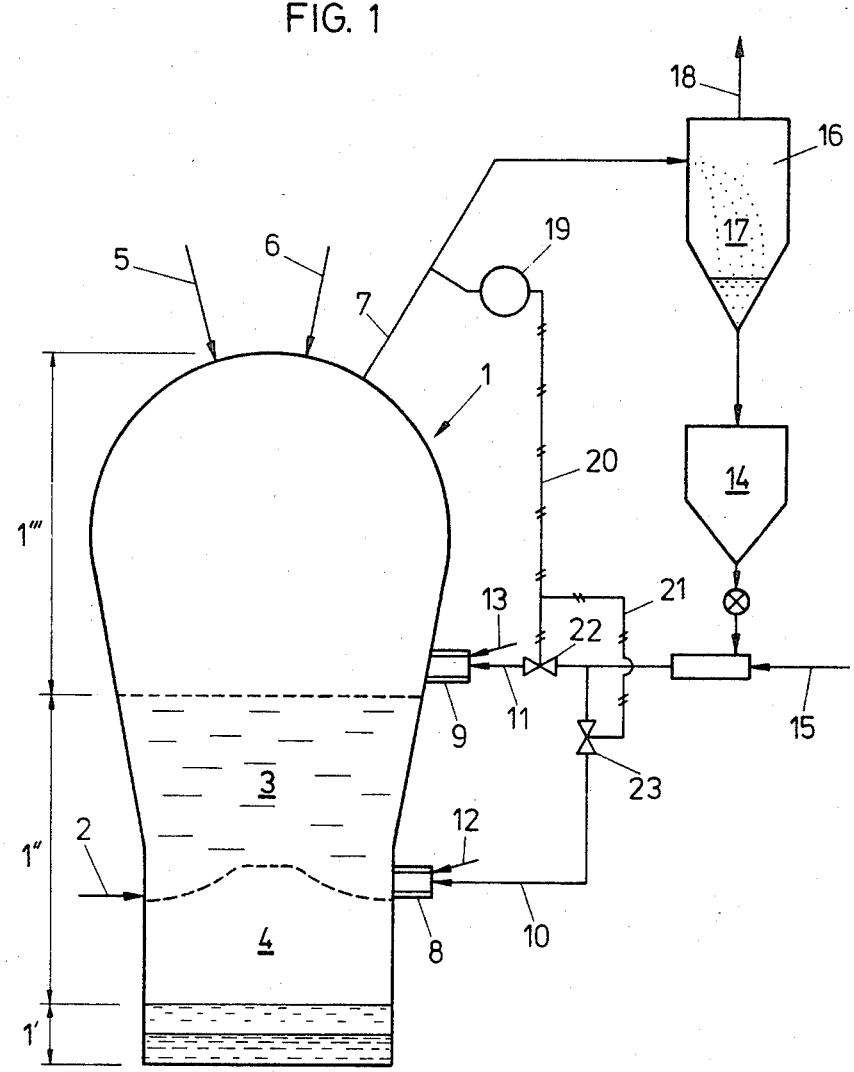

United States Patent [19]

Hauk et al.

[11] Patent Number: 4,728,360
[45] Date of Patent: Mar. 1, 1988

[54] PROCESS FOR THE PRODUCTION OF MOLTEN PIG IRON AND STEEL PRE-PRODUCTS

[75] Inventors: Rolf Hauk, Düsseldorf; Gero Papst, Buehl-Weitenung; Klaus Langner, Meerbusch Osterath, all of Fed. Rep. of Germany; Michael Nagl; Werner Kepplinger; Leopold Seirlehner, all of Linz, Austria

[73] Assignees: Voest-Alpine Akt., Austria; Korf Engineering GmbH, Fed. Rep. of Germany

[21] Appl. No.: 797,820

[22] Filed: Nov. 14, 1985

[30] Foreign Application Priority Data

Nov. 15, 1984 [AT] Austria ................................ 3613/84

[51] Int. Cl.$^4$ ............................................. C21B 11/08
[52] U.S. Cl. ............................................. 75/26; 75/38; 75/40; 75/43
[58] Field of Search .......................... 75/38, 26, 40, 43

[56] References Cited

U.S. PATENT DOCUMENTS 4,317,677 3/1982 Weber et al. .
4,396,421 8/1983 Stift et al. .
4,409,023 10/1983 Weber et al. ............................ 75/38
4,542,889 9/1985 Vuletic ................................ 266/156
4,588,437 5/1986 Kepplinger et al. ..................... 75/43

FOREIGN PATENT DOCUMENTS 376243 10/1984 Austria .
1186887 10/1965 Fed. Rep. of Germany .

Primary Examiner—Melvyn J. Andrews
Attorney, Agent, or Firm—Ostrolenk, Faber, Gerb & Soffen

[57] ABSTRACT

A process and an arrangement for the production of molten pig iron or steel pre-products from particulate ferrous material as well as for the production of reducing gas in a meltdown gasifier. A fluidized bed of coke particles is formed by the addition of coal and the injection of oxygen-containing gas. In order to ensure a satisfactory mode of operation of the meltdown gasifier even if coal of inferior quality with a high moisture content and a high portion of volatile matter is used, additional heat is supplied to the meltdown gasifier above the feed lines for the fluidized-bed-forming oxygen-containing gas by burning and/or degassing coal particles separated from the reducing gas.

5 Claims, 2 Drawing Figures

PROCESS FOR THE PRODUCTION OF MOLTEN PIG IRON AND STEEL PRE-PRODUCTS

The invention relates to a process for the production of molten pig iron or steel pre-products from particulate ferrous material, in particular from pre-reduced iron sponge, as well as for the production of reducing gas in a meltdown gasifier, wherein a fluidized bed of coke particles is formed by the addition of coal and the injection of oxygen-containing gas, as well as to an arrangement for carrying out the process.

A process of the defined kind is described in U.S. Pat. No. 4,317,677. There, the oxygen-containing gas or pure oxygen is blown into the lower region of the meltdown gasifier, thus producing a fluidized bed of coke particles. The particulate ferrous material, in particular prereduced iron sponge, and the lumpy coal are top-supplied through charging apertures provided in the hood of the meltdown gasifier, the falling particles are braked in the fluidized bed and the ferrous particles are reduced and melted as they are falling through the fluidized bed of coke. The melted metal covered by slag collects on the bottom of the meltdown gasifier. Metal and slag are drawn off through separate tap holes.

The temperature of the gas produced in the fluidized bed decreases upwardly on account of the heat required for heating and melting the iron sponge particles and on account of various endothermic reactions occurring during heating, dehydration, degasification and gasification of the charged coal. The thermal loss due to the endothermic reactions is the higher the lower the carbon content $C_{fix}$ of the carbon used, i.e., the higher its moisture content and portion of volatile matter. If the temperatures on top of the meltdown gasifier fall to below 1,000° C., the gas temperature will no longer suffice to completely decompose the volatile matter contained in the gas so that a condensation of tar-containing components takes place in the regions of low gas temperatures. The separation of tar, however, involves considerable difficulties in terms of plant technology and with respect to the treatment of the water required for the purification of gas.

The invention aims at avoiding these difficulties and has as its object to ensure a satisfactory mode of operation of the meltdown gasifier even if coal of inferior quality with a high moisture content and a high portion of volatile matter is used, such as, e.g., brown coal, which is cheap and available in large amounts.

In accordance with the invention, this object is achieved with a process of the initially defined kind in that, when using coal having a $C_{fix}$ content of less than 80%, additional heat is supplied to the meltdown gasifier above the feed lines for the fluidized-bed-forming oxygen-containing gas by burning and/or degassing coal particles separated from the reducing gas.

Advantageously, the additional heat supply is effected by burners coronally arranged in at least two horizontal planes and penetrating the side wall of the meltdown gasifier, i.e., by burners arranged in a plane in the lower region of the fluidized bed and by burners arranged in a plane closely above the fluidized bed. In between, i.e., in the intermediate plane, it is also possible to supply additional heat.

Preferably, the additional heat supply is controlled in dependence on the temperature measured in the reducing crude gas, wherein heating by burners in the upper heat supply plane is effected to relatively increase the temperature of the reducing crude gas and heating by burners in the lower heat supply plane takes place to relatively lower the temperature of the reducing crude gas.

The invention, furthermore, relates to an arrangement for carrying out the process, which arrangement comprises a refractorily lined meltdown gasifier including apertures for charging coal and ferrous material as well as a discharge duct for the reducing gas produced, furthermore, a slag and melt tap hole, a lower section of the meltdown gasifier being provided to collect molten material and liquid slag, a central section including feed lines for oxygen-containing gas and provided to accommodate a coke fluidized bed, and an upper section being provided as killing space, which arrangement is characterized in that burners are arranged above the feed lines, which burners penetrate the side wall of the meltdown gasifier and are equipped with supply ducts for dusty fuel and for oxygen.

Such burners may be operated as gasification burners, i.e., the fuel gasification under an excess of oxygen merely exclusively produces CO as the product of combustion.

Suitably, the burners are coronally arranged in at least two superposed horizontal planes.

According to an advantageous embodiment, the fuel supply ducts of the burners are connected with a dust storage container and with propellant lines. Suitable propellants include reducing gas freed from fine dust, top gas, any other burnable gas or even inert gas.

The burners also may be designed as plasma or other electric burners in order to introduce particularly high energy amounts.

According to a further suitable embodiment, the dust storage container is aligned in duct-like manner with a hot cyclone, which serves to separate fine dust substantially comprised of coal from the reducing crude gas.

Preferably, the burners of the superposed burner rings are connected with a temperature measuring means provided in the reducing crude gas and with a control loop.

Figure 2:
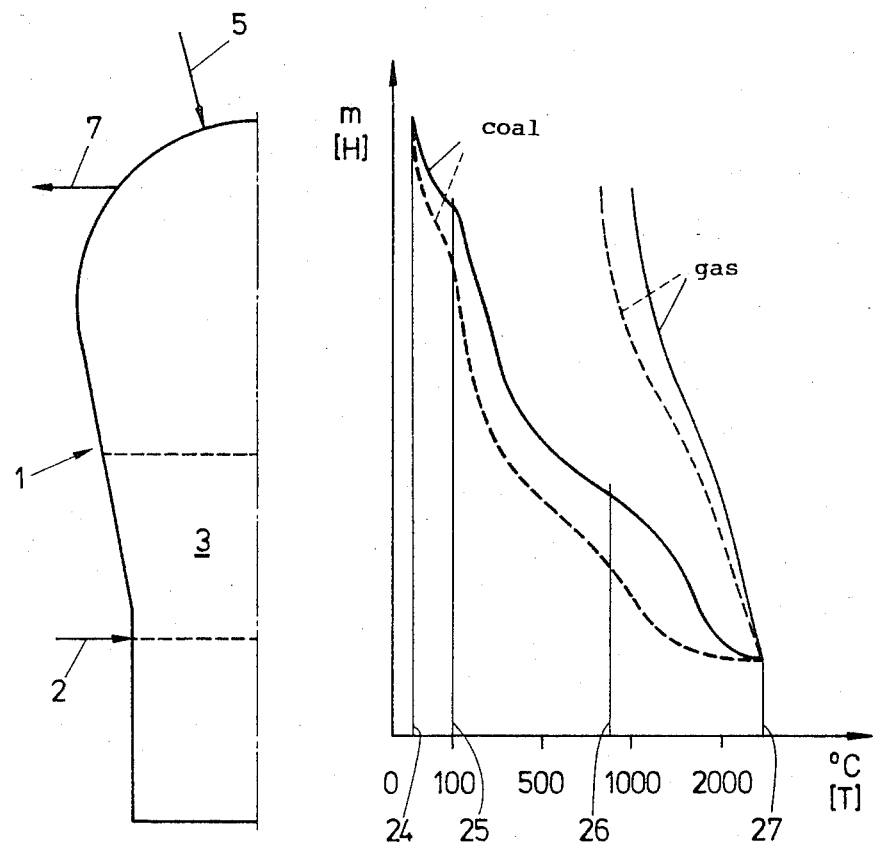

The process according to the invention and the arrangement for carrying out the same will be explained in more detail with reference to the accompanying drawings, wherein:

FIG. 1 is a schematically illustrated elevational view of a meltdown gasifier with the pertaining auxiliary means;

FIG. 2 indicates the temperature profile in such a meltdown gasifier, when working with high-quality coal, on the one hand, and with coal of inferior quality, on the other hand.

A refractorily lined meltdown gasifier 1 comprises a lower section 1', a central section 1" and a widening upper section 1'''. The lower section 1' is destined to receive molten metal and slag and is equipped with a melt and slag tap hole. In the central section 1", feed lines 2 for oxygen are provided, by means of which a fluidized bed 3 of coke particles is formed, which is maintained above a solid bed 4. The widening upper section 1''' is provided with supply ducts for lumpy coal 5 and for iron sponge 6. Heat is generated in the fluidized bed and reducing gas is produced. A discharge duct 7 is provided in the upper part for the reducing gas.

Above the oxygen feed lines 2, there are provided, according to the invention, gasification burners in two superposed horizontal planes, which burners each are arranged so as to be coronally distributed over the periphery of the meltdown gasifier. There is illustrated only one burner each. The individual burners 8 of the lower plane are arranged in the lower region of the fluidized bed, the upper plane being closely above the fluidized bed, with its burners being denoted by 9. Each gasification burner includes supply ducts for dusty fuel 10 and 11, respectively, and for oxygen 12 and 13, respectively.

The fuel supplies 10 and 11 are in connection with a storage container 14 with the dusty fuel being conveyed by means of a propellant supplied from line 15. The storage container 14 is charged via a hot cyclone 16; into this hot cyclone, reducing crude gas is injected from discharge duct 7 and, there, is freed from solids substantially consisting of coal particles 17. The purified reducing gas is discharged via conduit 18 and fed to a direct reduction shaft furnace.

For the purpose of controlling the operation of the burners 8 and 9, a temperature measuring device 19 is linked with the discharge duct 7 for the reducing crude gas, which is electrically connected with a control loop 20, 21. By the aid of this control loop, valves 22, 23 are actuated in dependence on the temperature measured wherein, with the temperature being too low, the burners 9 of the upper plane and, with the temperature being too high, the burners 8 of the lower plane, are actuated. Thus, the upper burners, when activated, serve to achieve a relatively higher reducing crude gas temperature and the lower burners, when activated, serve to achieve a relatively lower reducing crude gas temperature.

In FIG. 2, the temperature profile over the height of the meltdown gasifier is illustrated, the height meters being plotted on the ordinate and the temperatures being entered on the abscissa. The full lines indicate the temperature course of the coal added and of the gas formed when high-quality coal having a $C_{fix}$ content of about 80%, a content of volatile matter of 10%, of ash of 5%, and of water of 5% is used, the broken-line curves reflect the course when using inferior-quality coal having a $C_{fix}$ content of 50%, a content of volatile matter of 25%, of ash of 20% and of water of 5%. The coal charging temperature is illustrated by vertical line 24, the temperature after effected dehydration by vertical line 25, the temperature at the start of degassing by vertical line 26, and the final temperature by vertical line 27.

It is apparent that, due to the process according to the invention, the temperature courses of low-quality carbon carriers and of the gas produced may be adapted to the temperature courses of coal and gas, respectively, as they are attained when using high-quality coal.

What we claim is:

1. A method of producing molten pig iron or steel preproducts and reduction gas in a melt-down gasifier utilizing coal having a $C_{fix}$ content of less than 80%, comprising the steps of:
   (a) forming a fluidized bed of coke particles having a lower part, said fluidized bed being located in said melt-down gasifier and being formed by adding coal having said $C_{fix}$ content and injecting an oxygen-containing gas, heat being generated and reducing gas produced in said fluidized bed;
   (b) adding ferrous material from above to said fluidized bed material and reducing said ferrous materials in said fluidized bed to slag and molten pig iron or steel pre-products, said ferrous material comprising at least one of iron sponge particles and pre-reduced iron are particles with a substantial portion of particle sizes of more than 3 mm;
   (c) withdrawing said reducing gas containing coal particles from said gasifier;
   (d) separating said coal particles from said reducing gas;
   (e) generating additional heat by burning or gasifying said separated coal particles;
   (f) supplying said additional heat to said gasifier in a horizontal plane in the lower part of said fluidized bed to supplement the heat generated in said fluidized bed, said oxygen-containing bed being injected at points below said horizontal plane; and
   (g) separately drawing off said slag and said molten pig iron or said steel pre-products which collect at the bottom of said gasifier.

2. A process as set forth in claim 1, wherein said additional heat is supplied through burner means peripherally arranged in at least two horizontal planes and penetrating said meltdown gasifier laterally, said at least two horizontal planes comprising a lower plane in the lower part of said fluidized bed and an upper plane closely above said fluidized bed.

3. A process as set forth in claim 2, further comprising measuring the temperature of the reducing gas produced, and controlling said additional heat supply in dependence on said reducing gas temperature.

4. A process as set forth in claim 3, wherein heating by said burner means arranged in said upper plane is effected for achieving a relatively higher said reducing gas temperature and heating by said burner means arranged in said lower plane is effected for achieving a relatively lower said reducing gas temperature.

5. A process as set forth in claim 1 wherein said particulate ferrous material is pre-reduced iron sponge.

* * * * *